(12) United States Patent
Schuler

(10) Patent No.: US 8,938,911 B2
(45) Date of Patent: Jan. 27, 2015

(54) DEVICE FOR SPROUTING

(76) Inventor: Tina Schuler, Stockholm (SE)

(*) Notice: Subject to any disclaimer, the term of this patent is extended or adjusted under 35 U.S.C. 154(b) by 254 days.

(21) Appl. No.: 13/000,180

(22) PCT Filed: Jun. 18, 2009

(86) PCT No.: PCT/SE2009/000306
§ 371 (c)(1),
(2), (4) Date: Mar. 8, 2011

(87) PCT Pub. No.: WO2009/154538
PCT Pub. Date: Dec. 23, 2009

(65) Prior Publication Data
US 2011/0162271 A1 Jul. 7, 2011

(30) Foreign Application Priority Data
Jun. 19, 2008 (SE) ...................... 0801449

(51) Int. Cl.
*A01G 31/00* (2006.01)
*A01G 9/10* (2006.01)
*A01C 1/02* (2006.01)

(52) U.S. Cl.
CPC ............... *A01G 9/1026* (2013.01); *A01C 1/02* (2013.01)
USPC ...................... 47/61; 47/60; 47/69

(58) Field of Classification Search
USPC ............... 47/65.7, 66.1, 69, 61, 60; 210/469
See application file for complete search history.

(56) References Cited

U.S. PATENT DOCUMENTS

| | | | |
|---|---|---|---|
| 4,006,557 A | 2/1977 | Sawyer | |
| 4,016,676 A * | 4/1977 | Bennick, Jr. | 47/65.7 |
| 4,106,235 A * | 8/1978 | Smith | 47/59 R |
| D253,586 S * | 12/1979 | Rowe et al. | D11/152 |
| 4,317,311 A * | 3/1982 | Schmitt | 47/66.1 |
| 4,931,329 A * | 6/1990 | Sun | 428/36.92 |
| 5,375,372 A * | 12/1994 | Lee et al. | 47/69 |
| 5,561,946 A * | 10/1996 | Hsien et al. | 47/69 |
| 5,896,701 A * | 4/1999 | Schaerer | 47/61 |
| 5,927,007 A * | 7/1999 | Oda et al. | 47/60 |
| 5,930,951 A * | 8/1999 | Wong | 47/66.1 |
| 2012/0000127 A1* | 1/2012 | Liu | 47/66.1 |

FOREIGN PATENT DOCUMENTS

| | | |
|---|---|---|
| AU | 4012278 A1 | 3/1980 |
| CA | 2024376 A1 | 3/1992 |
| DE | 9203963 U1 | 7/1992 |
| DE | 19752159 A1 | 5/1999 |
| RU | 2156583 C1 | 9/2000 |

OTHER PUBLICATIONS

International Search Report, dated Sep. 14, 2009, from corresponding PCT application.

* cited by examiner

*Primary Examiner* — Kristen C Hayes
(74) *Attorney, Agent, or Firm* — Ober, Kaler, Grimes & Shriver; Christopher F. Lonegro; Royal W. Craig

(57) ABSTRACT

A device for sprouting includes an element (1; 101; 201) with opposing first and second openings (2, 7; 102, 7; 202, 7), a water and air-permeable material layer (15; 215), wherein the material layer (15; 215) can be removably mounted on the element (1; 101; 201) so that it covers the first opening (2; 102; 202) of the element (1; 101; 201). The device is characterized in that the element (1; 101; 201) is shell-shaped and extends continuously between the first and second openings (2, 7; 102, 7; 202, 7), and the second opening (7) can be closed.

19 Claims, 6 Drawing Sheets

DEVICE FOR SPROUTING

TECHNICAL FIELD OF THE INVENTION

The present invention relates to a device for sprouting, wherein the device comprises an element with opposing first and second openings, a water and air-permeable material layer, wherein the material layer can be removably mounted on the element so that it covers the first opening of the element.

PRIOR ART

RU2156583 deals with a method of producing sprouts, wherein one makes use of a vessel/glass jar. A water solution is filled into this jar, along with grains of corn, and one period of incubation takes 10-12 h. A hygroscopic net, such as one of cotton fabric, is placed over the opening of the jar. The jar is turned upside down and placed in a slanting position in a tray with water. Empirical experiments have shown that problems arise with mould attack of the sprouts.

From U.S. Pat. No. 4,006,557 is known a device for sprouting, wherein according to one embodiment this device comprises a container with a large opening at the bottom and a smaller opening at the top, wherein the larger opening is covered by a barrier layer with holes, such as a strainer. The openings on top are formed in a funnel-shaped lid. This structural design does not seem to promote the air flow through the device.

OBJECTS AND FEATURES OF THE INVENTION

A primary object of the present invention is to indicate a device of the kind defined above, wherein the device comprises few parts, and the handling of the device for sprouting is simple and thus also user-friendly.

Another object of the invention is that the parts making up the device are easy to clean or replaceable when necessary at low cost.

Yet another object of the present invention is that the sprouts obtained at the end of the process are of good quality.

A further object of the device of the present invention is that it can handle a larger quantity of beans/lentils/seeds per batch than known devices of corresponding size.

At least the primary object of the present invention is realised by a device having the features indicated in the following independent claim 1. Preferred embodiments of the invention are defined in the dependent claims.

BRIEF DESCRIPTION OF THE DRAWINGS

Preferred embodiments of the invention shall be described below with reference to the enclosed drawings, where.

DETAILED DESCRIPTION OF THE PREFERRED EMBODIMENTS OF THE INVENTION

Figure 1:
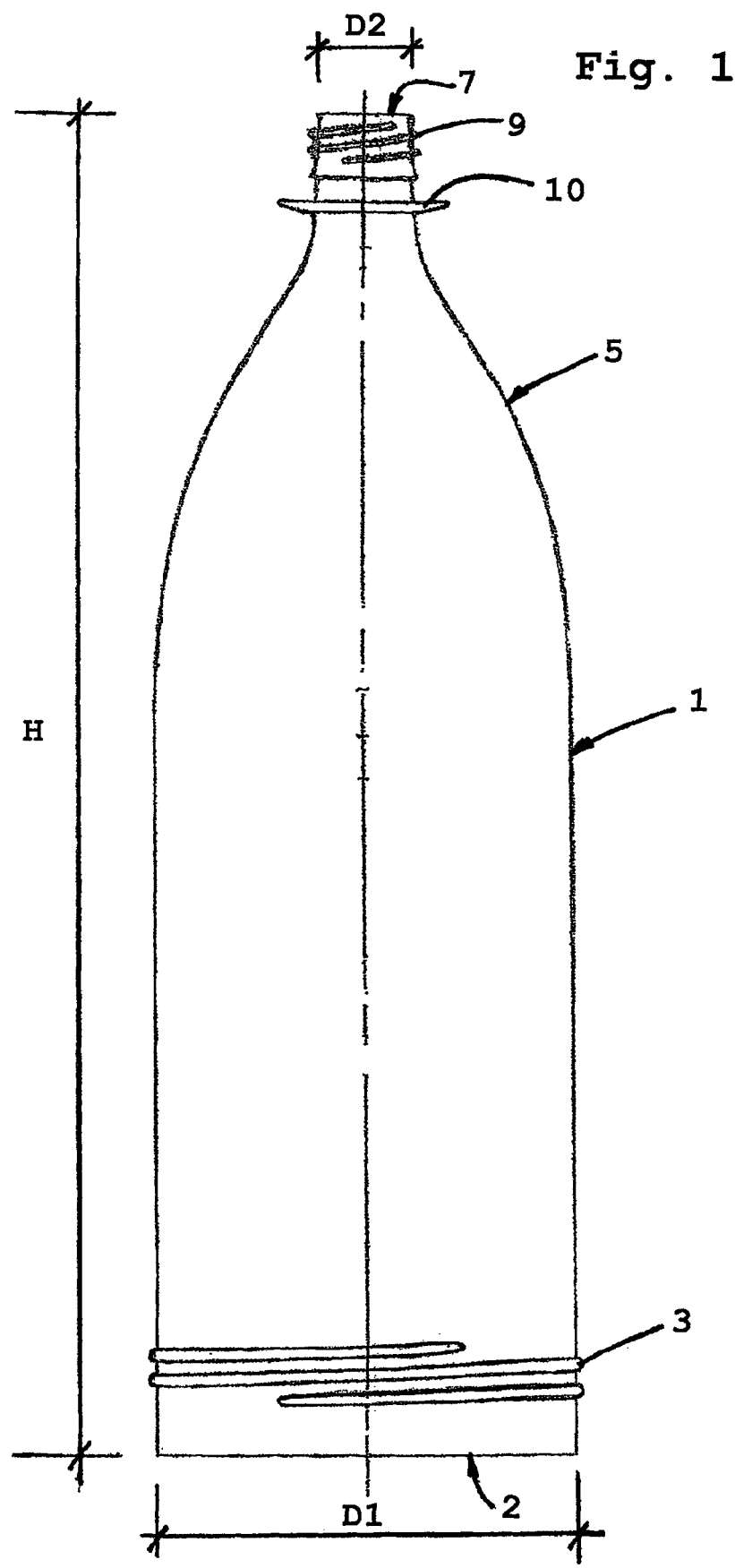
FIG. 1 shows a side view of a first embodiment of a tapered, annular element belonging to the device of the present invention.

The tapered, annular element in FIG. 1 is part of the device of the present invention and consists in principle of a transparent bottle with no bottom. Thus, there is a first opening 2 in the area of the lower end of the tapered, annular element 1. The tapered, annular element 1 moreover is configured with a first outer thread 3 adjacent to the lower end of the element 1.

In the region of the upper end of the element 1 is fashioned a narrowing section 5, which has a free end defined as a second opening 7 with a second outer thread 9. The element 1 has a collar 10 which is situated axially beneath the second thread 9 but adjacent to it. The element 1 defines a space which extends continuously between two openings 2, 7 of different size. Preferably, the entire element 1 is not cylindrical, but it is advantageous for the element 1 to be primarily cylindrical in the area of its lower half. An upper part of the element 1 preferably has a shape tapering toward the second opening 7.

Figure 2:
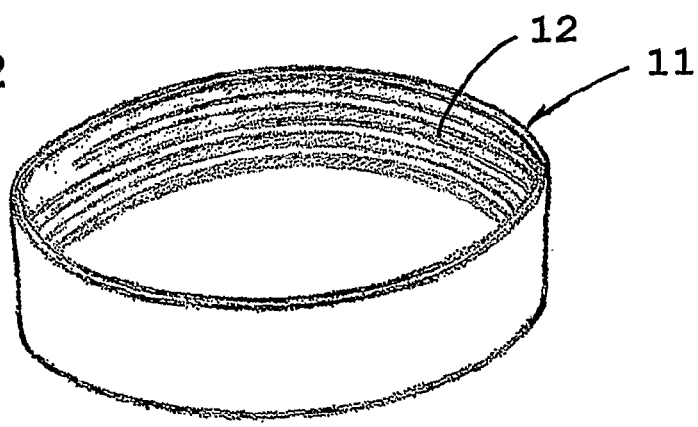
FIG. 2 shows a perspective view of a ring which is part of the device of the present invention.
Figure 5:
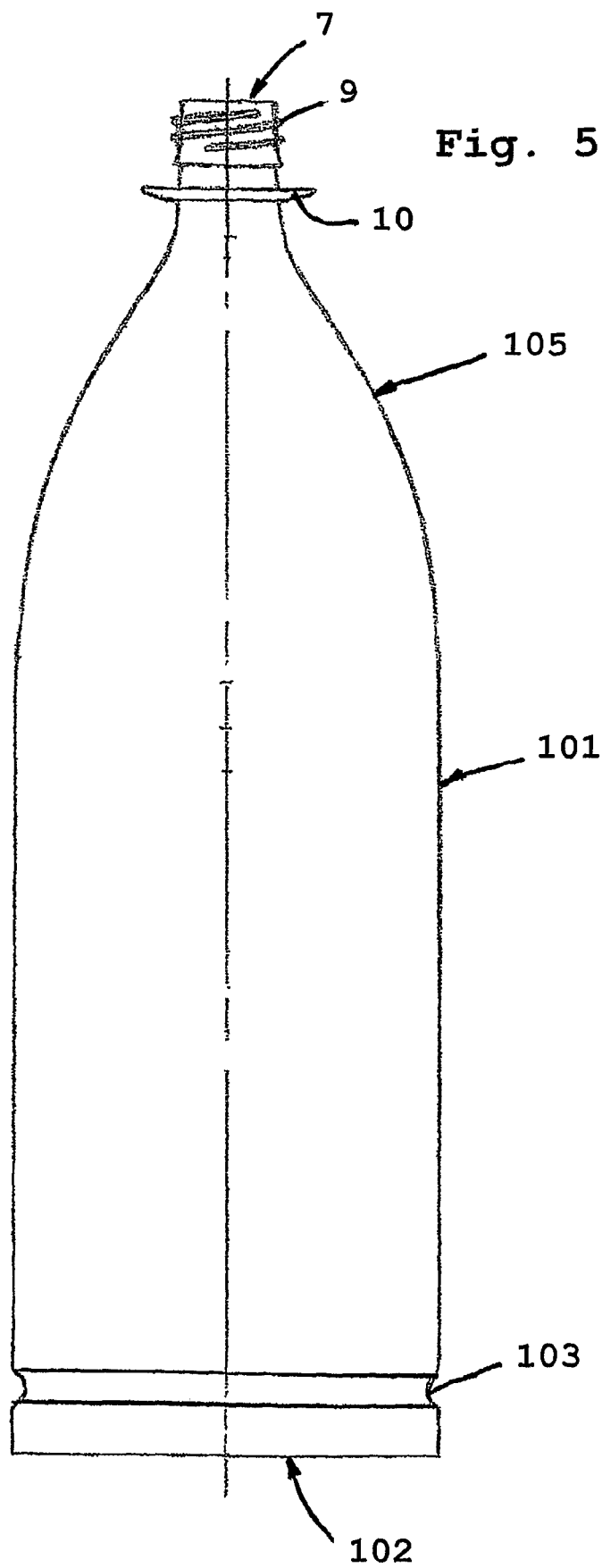
FIG. 5 shows a side view of another embodiment of a tapered, annular element which is part of the device of the present invention.

FIG. 2 shows a ring 11 which is part of the device of the present invention. The ring 11 has generally a circular-cylindrical shape and is provided with an internal thread 12, which is designed to cooperate with the first outer thread 3, that is, the ring 11 can be screwed onto the lower end of the element 1.

Figure 3:
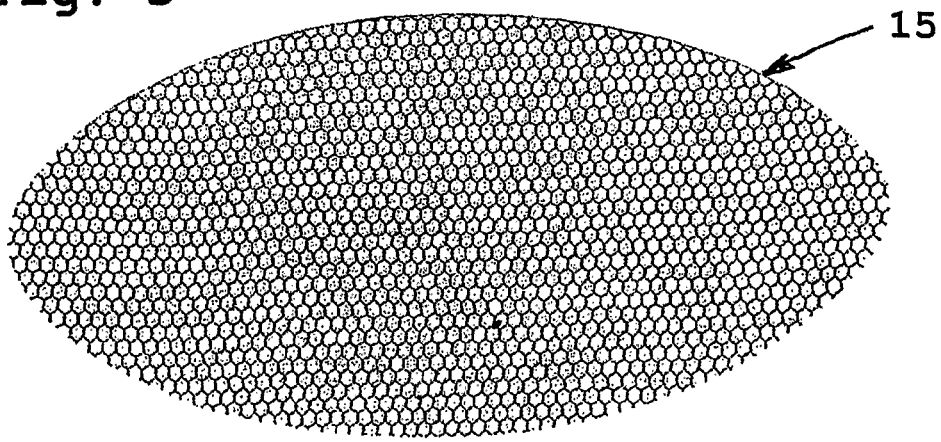
FIG. 3 shows a perspective view of a piece of tulle netting which is part of the device of the present invention.

FIG. 3 shows a piece of fine-mesh tulle netting 15, which preferably has a predominantly circular form in plan view. It has been found that tulle works exceptionally well in the device of the present invention. In principle, it is necessary to be able to hold even smaller seeds with fine-mesh tulle, such as alfalfa, in the device of the present invention. As an example and not limited to this, fine-mesh in this regard means a mesh width of 1-1.3 mm. The thickness of the tulle netting 15 is preferably on the order of 0.15-0.2 mm. If the device of the present invention will not be used for alfalfa seeds, one can consider larger mesh widths for the tulle netting 15.

Figure 4:
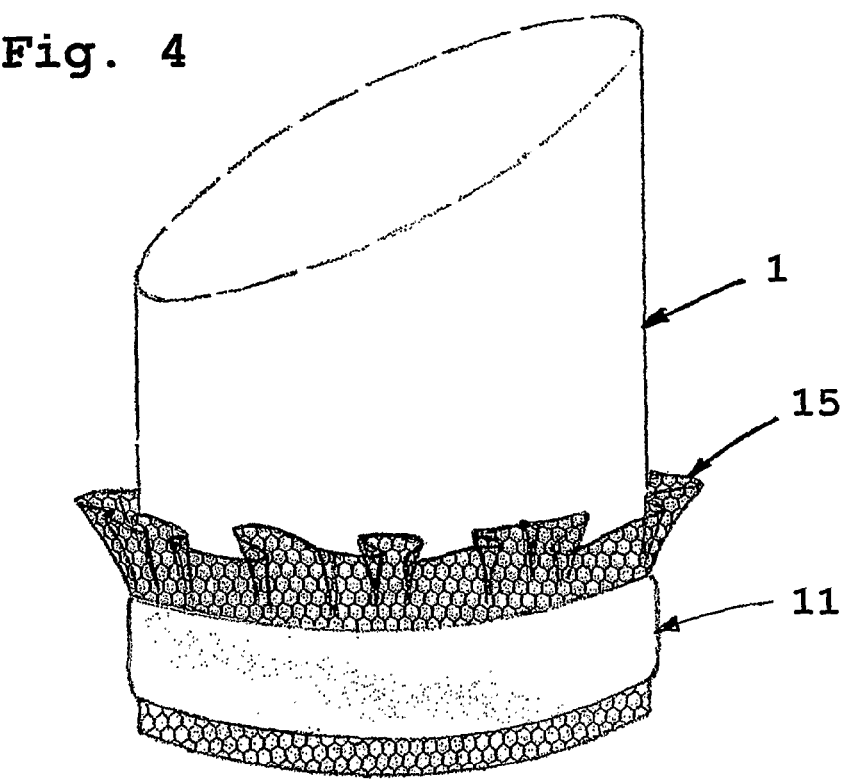
FIG. 4 shows a perspective view of the lower part of the device of the present invention, wherein the tulle netting is mounted on the tapered, annular element via the ring.

FIG. 4 shows a lower part of the device of the present invention, where the tulle netting 15 is applied to the lower end of the element 1. This is done by slipping the tulle netting 15 over the first opening 2 of the element 1 and bringing it to lie against the outside of the element 1 next to the first opening 2. Next, the ring 11 is threaded onto the lower end of the element 1, that is, the first outer thread 3 of the element 1 engages with the inner thread 12 of the ring 11. By suitable tightening of the ring 11, the tulle netting 15 located between the threads 3 and 12 is fixed over the first opening of the element 1. In this regard, it should be noted that the tulle net 15 used does not create any space where residual water can collect and furthermore one obtains exceptionally good conditions for gas exchange, since the tulle net 15 only produces an exceptionally low resistance to air.

Tulle has proven to be exceptionally suitable in this context. The tulle can be cleaned and reused for 1-5 batches of sprouts. When the tulle is obviously soiled the tulle net 15 is changed and replaced with a new tulle net 15.

FIG. 5-8 shows a first alternative embodiment of the device of the present invention, where a tapered, annular element 101 being part of the device consists in principle of a transparent bottle with no bottom. In the area of the lower end of the tapered, annular element 101 there is thus a first opening 102. Furthermore, the tapered, annular element 101 has an external groove 103 next to the lower end of the element 101. According to the embodiment shown, the groove 103 extends around the entire outer circumference of the element 101.

As for the upper end of the element 101, this is shaped similar to the above described element 1, and so we refer to the part of the above description dealing with the upper part of element 1. The same references apply to the upper part in the case of both embodiments.

Figure 6:
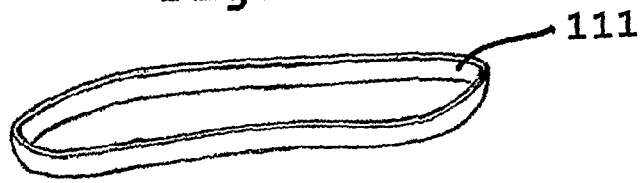
FIG. 6 shows a perspective view of a an elastic cord which is part of the second embodiment of the device of the present invention.

A ring of elastic cord 111 shown in FIG. 6 is part of the first alternative embodiment. In the scope of the present invention, one can consider using rings of other types of elastic band as alternatives to the elastic cord 111.

Figure 7:
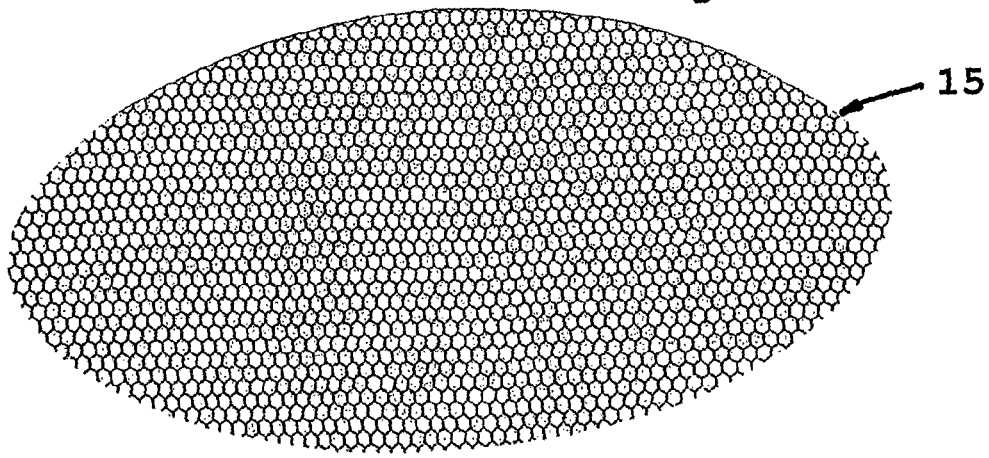
FIG. 7 shows a perspective view of a piece of tulle netting which is part of the second embodiment of the device of the present invention.

The tulle net 15 shown in FIG. 7 is in principle identical to the tulle net of FIG. 3 and therefore is subject to the same reference. This means that reference is made to what was said above as to the specification of the tulle net 15.

Figure 8:
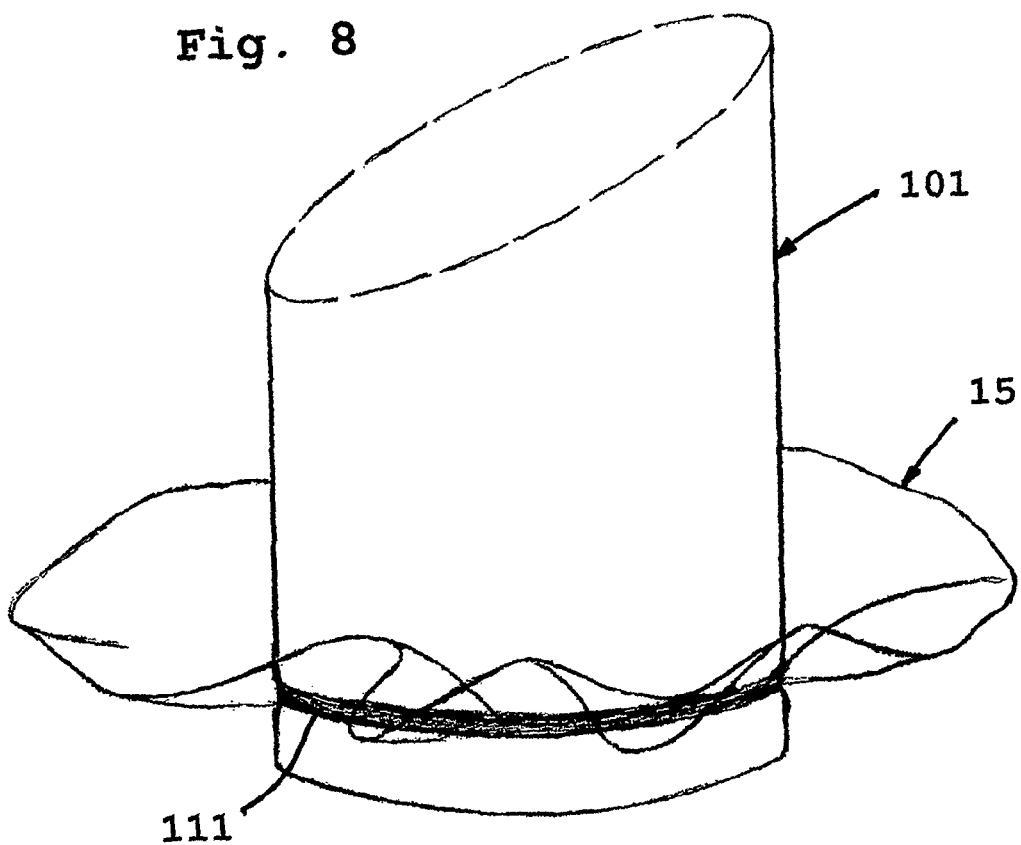
FIG. 8 shows a perspective view of the lower part of the second embodiment of the device of the present invention, wherein the tulle netting is mounted on the tapered, annular element via the elastic cord.

FIG. 8 shows how the tulle net 15 is placed on a lower part of the tapered, annular element 101 of the present invention. This is done by slipping the tulle net 15 over the first opening 102 of the element 101 and bringing it to lie against the outside of the element 101 next to the first opening 102. Then the elastic cord 111 is placed in the groove 103 and the tulle net 15 is clamped over the first opening 102.

Figure 9:
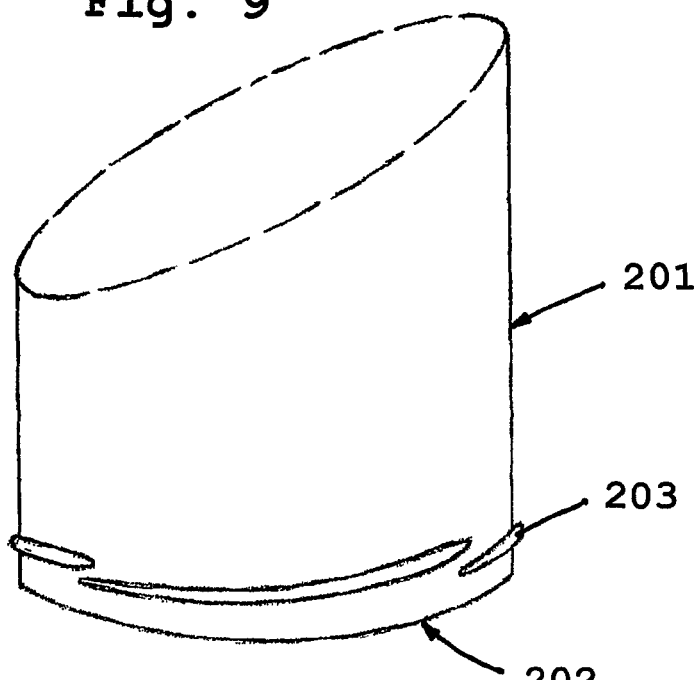
FIG. 9 shows a perspective view of a lower part of a tapered, annular element which is part of a third embodiment of the device of the present invention.
Figure 10:
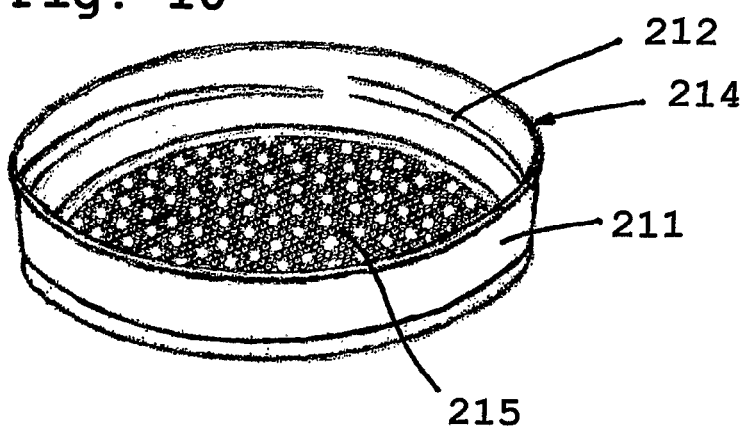
FIG. 10 shows a perspective view of a strainer which is part of a third embodiment of the device of the present invention.
Figure 11:
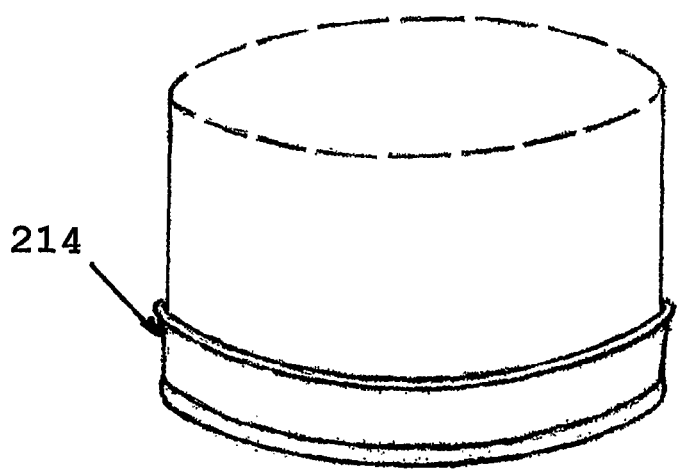
FIG. 11 shows a perspective view of a lower part of the third embodiment of the device of the present invention, wherein the strainer is mounted on the tapered, annular element.

FIG. 9-11 shows parts of a second alternative embodiment of the present invention.

FIG. 9 shows a lower part of a tapered, annular element 201, provided with a first opening 202 at the bottom. Next to the first opening 202 is arranged an outer, threadlike engagement device 203 on the tapered, annular element 1.

FIG. 10 shows a strainer 214, which comprises a ring 211 with an internal, threadlike engagement device 212 and a net 215, preferably of woven, nonwoven or molded metal or plastic, at one axial end of the ring 211. By interworking of the engagement devices 203, 212 the strainer 214 can be mounted removably on the lower end of the tapered, annular element 201. As for the mesh size of the netting 215, this should be on the order of 1-1.3 mm in order to sprout alfalfa. The net is preferably made of metal or plastic and very thin, that is, with wire thickness in the range of 0.1-0.5 mm, preferably on the order of 0.25 mm.

The following can be said about the parameter relations for the tapered, annular element 1; 101; 201. In an empirically preferred embodiment, the height H should be around three (3) times the diameter D1 of the first opening 2; 102; 202, see FIG. 1, that is, $3 \times D1 \approx H$. The height H should be at least greater than or equal to twice the diameter D1, that is, $H \geq 2 \times D1$. In this regard, it should be noted that there must be a space left behind in the device of the present invention, that is, within the height H above the growing sprouts. Through this space, oxygen can be supplied to the sprouts.

The tapered, annular element 1; 101; 201 should have a basically cylindrical form from the first opening 2; 102; 202 and toward the second opening 7 and extend for around b of the height H. For the remainder of the height, the tapered, annular element 1 should taper continuously toward the second opening 7, but the tapered, annular element 1; 101; 201 can be basically cylindrical from the collar 10 and up to the second opening 7. In general, the tapering part of the tapered, annular element 1; 101; 201 has a conical form.

The diameter D1 of the first opening 2; 102; 202 should be around four (4) times the diameter D2 of the second opening 7, that is, $4 \times D2 = D1$.

In general for all the embodiments described above, the tapered, annular element 1; 101; 201 has a basically flat inside. This facilitates cleaning of the tapered, annular element 1, which is important to the sprouting. Moreover, it is easy to harvest the resulting sprouts, as they cannot attach to projecting parts. A basically flat inside also means no deposits can stick to the inside. The flat inside also promotes gas exchange, since the air resistance is reduced and there is no space where the air can "stick".

It is advisable to proceed as follows when sprouting with a device according to the present invention.

Figure 12:
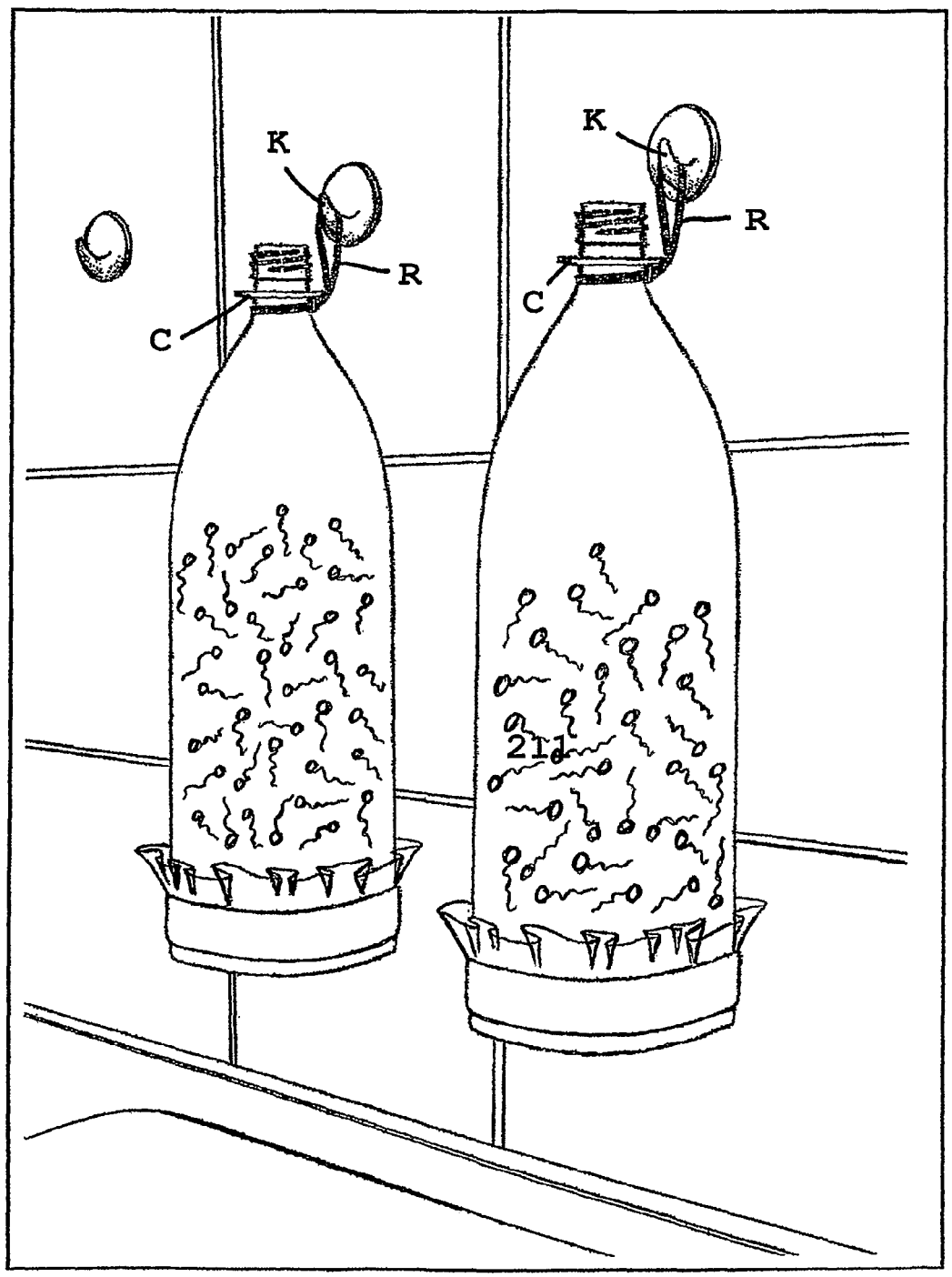
FIG. 12 shows a perspective view of two devices according to the present invention, wherein the sprouting process in the devices is shown schematically.

When loading the legumes, a stopper is screwed onto the second opening 7 and the tapered, annular element 1; 101; 201 is placed on a surface with the second opening 7 against the surface. Legumes are supplied via the first opening 2; 102; 202. After soaking overnight, a netting 15; 215 is placed over the first opening 2; 102; 202 and the excess water is emptied through the first opening. Rinse a couple times under running water until the water becomes clear. Turn the tapered, annular element 1; 101; 201 so the first opening 2; 102; 202 is downward, unscrew the stopper from the second opening 7 and rinse off the legumes which may have attached higher up on the inside of the tapered, annular element 1; 101; 201 so they are placed on the net 15; 215. Preferably the tapered, annular element 1; 101; 201 with the net 15; 215 can now be hung up by a hook on the wall above the sink. This is illustrated in FIG. 12 where two tapered, annular elements 1 are hung from hooks K by means of straps R placed under a respective collar C of the shell-shaped element 1. In this context, it should be noted that, in the position shown in FIG. 12, one achieves a free exchange of air through the devices of the present invention. Since the devices are preferably hung above a sink, the water draining from the devices runs directly into the sink. Furthermore, the hanging arrangement shown in FIG. 12 takes up little space.

After one day, water is poured into a separate vessel. The device according to the present invention is taken down from the wall and dipped into the separate vessel so that water covers the sprouts. The mass of sprouts is loosened up in the water so that all sprouts become soaked. The device is hung back up on the wall and the sprouting continues. The above-described procedure is repeated morning and evening until the sprouting is finished, which takes around 2 days for mung beans and lentils. Alfalfa sprouts take somewhat longer.

Empirical tests during sprouting with a device according to the present invention per the embodiment in FIG. 5-8 have shown a temperature increase of 2.5-3° C. among the sprouts as compared to the temperature outside the device.

In connection with the sprouting it has been found that a mist forms in the space above the sprouts. It is assumed that this mist consists of water vapour and indicates an elevated humidity in the tapered, annular element 1; 101; 201, and this elevated humidity is considered to be positive for the sprouting.

While sprouting, the sprouts give off $CO_2$ which is heavier than air. It is believed that the sprouts generate a relatively large resistance to the $CO_2$ sinking down through the sprouts. When a sufficient amount of $CO_2$ has collected in the mist above the sprouts, the $CO_2$ becomes so heavy that it sinks down through the sprouts and thereby gives rise to a slow undulatory motion in the gas exchange. Since the sprouts are located in an essentially cylindrical part of the tapered, annular element 1; 101; 201, this helps the $CO_2$ to sink down through the sprouts. Based on the principles of thermodynamics, it can be assumed that when the $CO_2$ sinks down through the sprouts, fresh oxygen is drawn in through the second opening 7 of the tapered, annular element 1; 101; 201. In this regard, it will be pointed out that $CO_2$ generally has an antibacterial effect, which is taken to promote the freshness of the sprouts.

When the sprouts are ready for harvesting, the net 15; 215 is removed from the first opening and the sprouts are kept in a container which is preferably kept in the refrigerator. The net 15; 215 is cleaned and reused, if it is possible to clean it. If not, especially in the case of the tulle net 15, the net is replaced. The tapered, annular element 1; 101; 201 and other parts of the device are also cleaned in expectation of the next sprouting.

In this context it should be noted that the device of the present invention defines an internal space which extends continuously between the first opening 2; 102; 202 and the second opening 7. There is no separating/dividing element such as intervening layers of material between the first opening 2; 102; 202 and the second opening 7.

Conceivable Modifications of the Invention

In the above described embodiments the tapered, annular element 1; 101; 201 comprises a cylindrical part as well as a part narrowing toward the second opening 7. But in the context of the present invention, the tapered, annular element can conceivably be mainly cylindrical along its entire height H, although a slight conicity of the "cylinder" can be advantageous by enabling a stacking of the tapered, annular elements during transport, for example. In the broadest scope of the invention, the diameter D2 is thus essentially equal to the diameter D1. Furthermore, the diameter D2 can advantageously decrease continuously down to ¼ of the diameter D1.

It should also be noted that the "cylindrical" part in the above-described embodiments of the tapered, annular element can have a slight conicity to enable a stacking of the shell-shaped elements in each other.

By slight conicity in this connection is meant a conicity just barely differing from the cylindrical shape.

The above-described embodiments make use of a net 15; 215 to cover the first opening 2; 102; 202 of the tapered, annular element 1; 101; 201. In the context of the present invention, however, one can conceive of using other thin, perforated material having a high degree of water and air permeability. The thickness of the material is preferably in the range of 0.1-1 mm.

The above-described embodiments made use of different ways of securing the net 15; 215 on the tapered, annular element's first opening 2; 102; 202. The ways indicated above are only examples. Thus, one can think of alternative ways of anchoring the net, for example, with a snap fastener and clamping rings.

The invention claimed is:

1. A device for sprouting, comprising
an annular element extending vertically a height (H) along an axis between a first annular opening and a second annular opening and enclosing an unobstructed internal volume, said annular element comprising
   a lower, cylindrical portion having a diameter and extending upward from said first annular opening at a lower end of said cylindrical portion to an upper end of said cylindrical portion, said first annular opening having a diameter equal to said diameter of said cylindrical portion, and
   an upper, tapered portion extending from said upper end of said cylindrical portion to said second annular opening at an upper end of said tapered portion,
   wherein said height (H) of said annular element is at least twice said diameter of said cylindrical portion, and
a water and air-permeable material layer removably mounted on said annular element so that it covers said first annular opening,
wherein said device is adapted to be suspended above a surface whereby gas exchange is enabled directly between said internal volume and an uncontained space external to and beneath said device via said first annular opening.

2. The device according to claim 1, further comprising a stopper adapted for selective closure of said second annular opening.

3. The device according to claim 2, further comprising an external thread arranged adjacent to said second opening,
   and wherein said stopper further comprises an internally threaded portion for cooperative engagement with said external thread whereby said stopper is removably mounted over the second opening in order to close said second opening.

4. The device of claim 1, wherein said material layer is a net.

5. The device of claim 4, wherein said material layer consists of a tulle net.

6. The device according to claim 4, further comprising
a ring with an internal thread, and
an external thread arranged adjacent to the first opening and adapted for cooperative engagement with said internal thread of said ring,
wherein said net is removably stretched over said first opening by clamping a portion of said net between said ring and said annular element.

7. The device according to claim 1, wherein said material layer comprises a strainer of metal or plastic.

8. The device according to claim 1, characterised in that the water and air-permeable material consists of a net of metal or plastic.

9. The device according to claim 1, wherein said second annular opening has a diameter and wherein said diameter of said cylindrical portion is at least twice said diameter of said second annular opening.

10. The device according to claim 1, wherein said cylindrical portion extends upward from said first annular opening two-thirds of said height (H) of said annular element.

11. A kit for sprouting comprising in combination
an annular element extending a height (H) along a vertical axis between a first annular opening and a second annular opening, said annular element enclosing an unobstructed internal volume and comprising
   a lower, cylindrical portion having a diameter and extending upward from said first annular opening at a lower end of said cylindrical portion to an upper end of said cylindrical portion, said first annular opening having a diameter equal to said diameter of said cylindrical portion, and
   an upper, tapered portion extending from said upper end of said cylindrical portion to said second annular opening at an upper end of said tapered portion,
   wherein said height (H) of said annular element is at least twice said diameter of said cylindrical portion, and
a water and air-permeable layer of perforated material removably mounted on said annular element so as to cover entirely said first annular opening,
a stopper adapted for selective closure of said second opening, and a hanger adapted to suspend said annular element such that said first opening is unobstructed by any supporting surface below whereby gas exchange is enabled directly between said internal volume and an uncontained space external to and beneath said annular element via said first annular opening.

12. The kit of claim 11, wherein said second annular opening has a diameter and wherein said diameter of said cylindrical portion is at least twice said diameter of said second annular opening.

13. The kit of claim 11, wherein said cylindrical portion extends upward from said first annular opening two-thirds of said height (H) of said annular element.

14. The kit of claim 11, wherein said perforated material is a net.

15. The kit of claim 14, wherein said net consists of a tulle net.

16. The kit of claim 11, wherein said perforated material comprises a strainer of metal or plastic.

17. The kit of claim 11, further comprising a ring adapted for cooperative engagement with an external surface of said cylindrical portion of said annular element,
whereby said perforated material is removably mounted over said first annular opening by clamping between said ring and said outside surface.

18. The kit of claim 11, wherein said hanger is a strap engaged to said annular element.

19. The kit of claim 11, wherein said hanger is a hook.

* * * * *

UNITED STATES PATENT AND TRADEMARK OFFICE
CERTIFICATE OF CORRECTION

PATENT NO.         : 8,938,911 B2
APPLICATION NO.    : 13/000180
DATED              : January 27, 2015
INVENTOR(S)        : Tina Schuler Page 1 of 1

It is certified that error appears in the above-identified patent and that said Letters Patent is hereby corrected as shown below:

In the Specification

Column 4, line 3 the character [b] should be corrected and shown as [2/3]; and

Column 4, line 12 the character [-] should be corrected and shown as [≈]

Signed and Sealed this
Fifth Day of July, 2016

Michelle K. Lee
*Director of the United States Patent and Trademark Office*